United States Patent
Ehrenberg et al.

(10) Patent No.: US 7,817,262 B2
(45) Date of Patent: Oct. 19, 2010

(54) DEVICE FOR MEASURING POSITIONS OF STRUCTURES ON A SUBSTRATE

(75) Inventors: Tillmann Ehrenberg, Schoeffengrund (DE); Uwe Goetz, Braunfels-Neukirchen (DE); Guenter Schieferstein, Huettenberg (DE)

(73) Assignee: Vistec Semiconductor Systems GmbH, Weilburg (DE)

( * ) Notice: Subject to any disclaimer, the term of this patent is extended or adjusted under 35 U.S.C. 154(b) by 237 days.

(21) Appl. No.: 12/215,273

(22) Filed: Jun. 26, 2008

(65) Prior Publication Data
US 2009/0002720 A1 Jan. 1, 2009

(30) Foreign Application Priority Data
Jun. 27, 2007 (DE) .................. 10 2007 030 203

(51) Int. Cl.
*G01N 21/00* (2006.01)
*G01B 11/14* (2006.01)
*G03B 27/53* (2006.01)

(52) U.S. Cl. ............... 356/237.2; 356/615; 356/237.3; 355/30; 250/492.1

(58) Field of Classification Search ... 356/237.1–237.5, 356/430; 250/492.1, 492.2, 492.3, 443.1; 355/30, 53, 72, 75; 700/110, 109, 108
See application file for complete search history.

(56) References Cited

U.S. PATENT DOCUMENTS

| | | | |
|---|---|---|---|
| 5,550,633 A * | 8/1996 | Kamiya ...................... 356/500 |
| 5,909,276 A * | 6/1999 | Kinney et al. ............ 356/237.2 |
| 5,914,493 A * | 6/1999 | Morita et al. ............ 250/492.2 |
| 6,259,960 B1 * | 7/2001 | Inokuchi .................... 700/110 |
| 6,377,870 B1 | 4/2002 | Blaesing-Bangert et al. |
| 6,392,737 B1 * | 5/2002 | Ito et al. ....................... 355/30 |
| 6,580,087 B1 | 6/2003 | Suzuki et al. |
| 6,753,942 B2 * | 6/2004 | Nagahashi ................... 355/30 |
| 6,923,077 B2 | 8/2005 | Kim et al. |

(Continued)

FOREIGN PATENT DOCUMENTS

DE 19949005 5/2001

(Continued)

OTHER PUBLICATIONS

Dr. Carola Blaesing, Pattern Placement Metrology for Mask Making, Mar. 31, 1998, pp. 1-11, Leica Microsystems AG, Wetzlar, Germany.

(Continued)

*Primary Examiner*—Sang Nguyen
(74) *Attorney, Agent, or Firm*—Simpson & Simpson, PLLC

(57) ABSTRACT

A device for measuring positions of structures (3) on a substrate (2) is disclosed, wherein the device is enclosed by a climatic chamber (30). An illumination and imaging means (6, 14) is also arranged in the climatic chamber (30). At least one loading station (32) for substrates is formed on an outer wall (30a) of the climatic chamber (30), wherein at least one transport means (34, 40) for transporting the substrates is provided within the climatic chamber (30). A means (36) for orienting the substrates (2) with respect to a coordinate system of the coordinate measuring machine (1) is provided, wherein the transport means (34, 40) deposits the substrates (2) on the means (36) for orienting.

12 Claims, 5 Drawing Sheets

U.S. PATENT DOCUMENTS

| | | | |
|---|---|---|---|
| 7,138,629 B2 * | 11/2006 | Noji et al. | 250/311 |
| 7,196,507 B2 | 3/2007 | Schneidewind et al. | |
| 7,265,823 B2 | 9/2007 | Kreh et al. | |
| 7,522,267 B2 * | 4/2009 | Hofmeister et al. | 355/72 |
| 2002/0011835 A1 | 1/2002 | Yamazaki | |
| 2005/0083037 A1 | 4/2005 | Schneidewind et al. | |

FOREIGN PATENT DOCUMENTS

| | | |
|---|---|---|
| DE | 10304174 | 9/2003 |
| DE | 102004013707 | 4/2005 |
| DE | 10351848 | 6/2005 |

OTHER PUBLICATIONS

Wolfgang Vollrath, DUV microscopy for wafer and mask inspection and metrology, Oct. 1997, pp. 1-5, Leica-Microsystems Wetlzar GmbH, Wetzlar, Germany.

* cited by examiner

DEVICE FOR MEASURING POSITIONS OF STRUCTURES ON A SUBSTRATE

CROSS REFERENCE TO RELATED APPLICATIONS

This patent application claims priority of German Patent Application No. 10 2007 030 203.9, filed on Jun. 27, 2007, which application is incorporated herein by reference.

FIELD OF THE INVENTION

The present invention relates to a device for measuring positions on a substrate. In particular, the invention relates to a device for measuring positions on a substrate, wherein the device is enclosed by a climatic chamber. The device itself includes a coordinate measuring machine comprising a measurement table movable in one plane. An illumination and imaging means is also arranged in the climatic chamber. At least one loading station for substrates is formed on an outer wall of the climatic chamber. At least one transport means for transporting the substrates is provided within the climatic chamber.

BACKGROUND OF THE INVENTION

A coordinate measuring device for measuring structures on wafers and masks used for their production is known from the lecture script "Pattern Placement Metrology for Mask Making" by Dr. Carola Bläsing. This lecture was given on the occasion of the Semicon conference, Education Program, in Geneva on Mar. 31, 1998. The description given therein is the basis for a coordinate measuring device as it is commercially available in many forms.

The German published application DE 19949005 discloses a means and a method for introducing various transparent substrates into a high-precision measuring device. The means is enclosed by a climatic chamber. Within the climatic chamber, there is, for example, provided a magazine having several compartments in which substrate holders for various substrates are deposited. Furthermore, a loading station via which substrates may be introduced into the climatic chamber is provided on at least one outer wall of the climatic chamber. Within the climatic chamber, there is also provided an automatic transfer means withdrawing substrates from the magazine and transporting them to the loading station or positioning them on the measurement table of the means.

SUMMARY OF THE INVENTION

It is the object of the present invention to configure a device for measuring positions of structures on a substrate such that the substrate may be deposited with various orientations on a measurement table. The device is also supposed to allow the determination of the current orientation of a mask or a substrate.

This object is achieved by a device for measuring positions of structures on a substrate comprising: a climatic chamber enclosing the device, wherein the device includes a coordinate measuring machine and a measurement table movable in one plane, an illumination and imaging means is arranged in the climatic chamber, at least one loading station for substrates is formed on an outer wall of the climatic chamber, at least one transport means for transporting the substrates is provided within the climatic chamber, means for orienting the substrates with respect to a coordinate system of the coordinate measuring machine, wherein the transport means deposits the substrates on the means for orienting the substrates.

For the present invention, it is advantageous that a means for orienting the substrates with respect to a coordinate system of the coordinate measuring machine is associated with the device for measuring positions of structures on a substrate. The substrates may be deposited on the means for orienting the substrates by a provided transport means.

The means for orienting may be arranged within the climatic chamber. It is advantageous if the means for orienting the substrates is arranged in at least one air flow formed in the climatic chamber.

According to a further advantageous embodiment of the invention, the means for orienting may be arranged outside the climatic chamber. The means for orienting the substrates is a separate means that may be associated with the device for measuring positions of structures on substrates.

The orienting of the substrates may be defined as rotating. The orienting of the substrates may also be defined turning. It is further contemplated that the orienting of the substrates is defined as rotating and turning.

A robot depositing the substrate on the means for orienting the substrate may be associated with the loading station.

The means for orienting includes an illumination means and a camera. At least part of the substrate may be captured by the camera. An evaluation unit for an identification of the substrate may also be associated with the camera. It is also contemplated that a full image of the substrate may be acquired by the camera. The orientation of the substrate may then be determined from the full image. For this purpose, at least one computer determining the orientation of the substrate and/or setting an orientation of the substrate or the mask input by the user is associated with the means for orienting.

A magazine for depositing substrates may also be associated with the coordinate measuring machine in the climatic chamber. The coordinate measuring machine may further include a granite block on which the movable measurement table is arranged.

BRIEF DESCRIPTION OF THE DRAWINGS

In the following, embodiments and their advantages will be explained in more detail with reference to the accompanying figures.

DETAILED DESCRIPTION OF THE INVENTION

Figure 1:
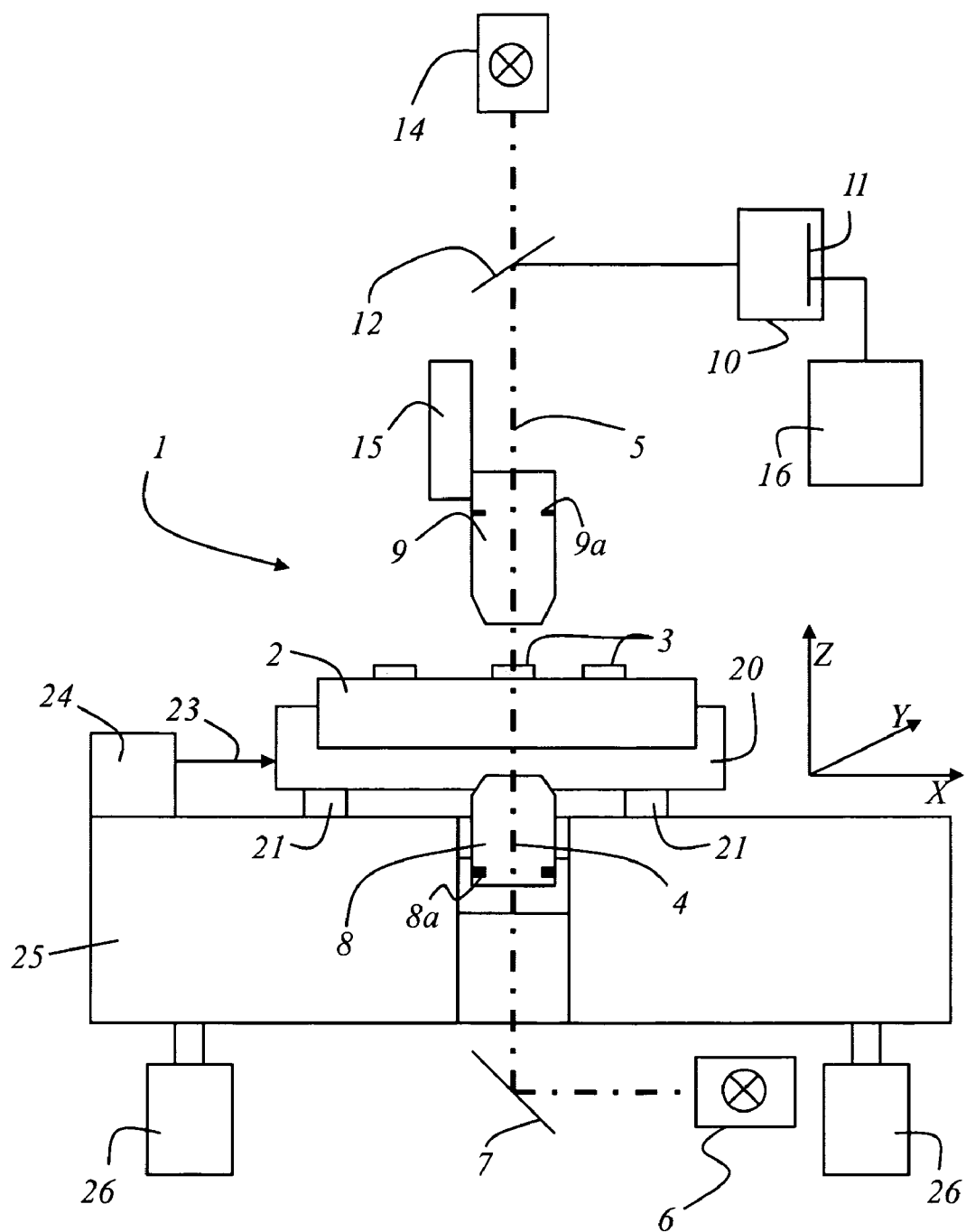
FIG. 1 schematically shows a prior art coordinate measuring device.

FIG. 1 shows a coordinate measuring machine 1 as already known in several forms in prior art. Coordinate measuring machine 1 includes a granite block 25 on which a measurement table 20 movable in the X-coordinate direction and in the Y-coordinate direction is positioned to be displaceable on corresponding air bearings 21. Measurement table 20 carries a substrate or a mask 2 to which several structures 3 are applied. The position of measurement table 20 is measured by means of a laser interferometer 24 directing a laser measurement beam 23 onto measurement table 20. Granite block 25 is mounted on legs 26 with an anti-vibration arrangement. An incident light illumination means 14 and a transmitted light illumination means 6 are provided. Transmitted light illumination 6 directs the light beam originating therefrom to a deflecting mirror 7 which, via a condenser 8 provided with an aperture 8a, illuminates substrate or mask 2. The light coming from transmitted light illumination source 6 reaches substrate 2 via an illumination light beam 4. Opposite structures 3, a measurement objective 9 is provided which may be moved in the Z-coordinate direction by a moving means 15 to thus set various focus positions. The light coming from incident light illumination light source 14 reaches substrate 2 via an aperture 9a of measurement objective 9. The light coming from substrate 2 also passes through measurement objective 9 and is deflected to a detector 10 by means of a beam splitter 12. Detector 10 may be implemented as a camera having a computer 16 associated therewith which generates a digital image from the captured light signals. In a particular embodiment, detector 10 may be provided with a CCD chip 11.

Figure 2:
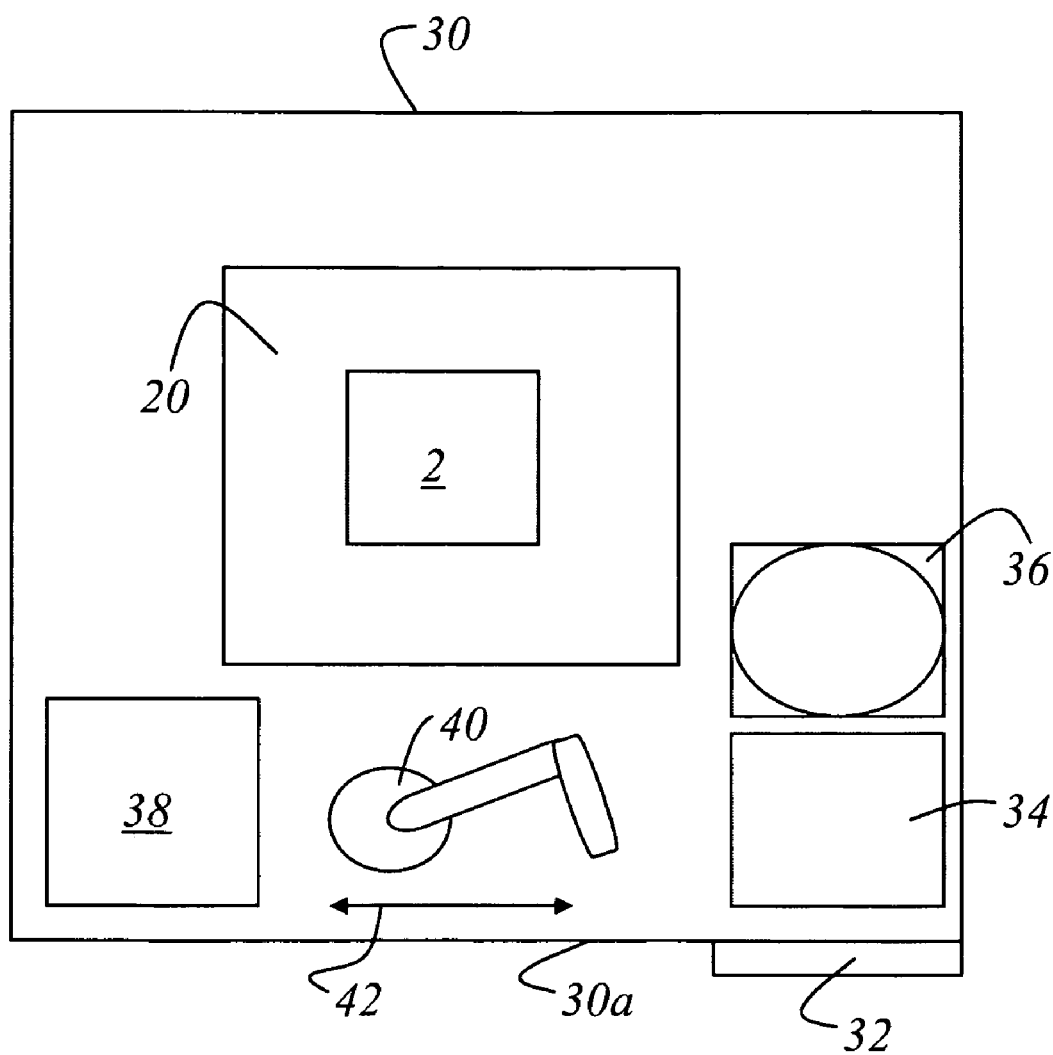
FIG. 2 shows a first embodiment of the device for measuring positions of structures on a substrate, wherein the means for orienting the substrates is mounted in the climatic chamber.

FIG. 2 shows a first embodiment of the device for measuring structures on substrate 2. Coordinate measuring machine 1 is shown only schematically and is represented by measurement table 20 and substrate 2 deposited on measurement table 20. Coordinate measuring machine 1 is arranged within a climatic chamber 30. An outer wall 30a of climatic chamber 30 may be provided with a loading station 32. Loading station 32 is followed by a transport means 34. With the help of transport means 34, the substrate or the mask may be transferred to a means 36 for orienting the mask. A further transport robot 40 which receives the mask from the transport means and, if necessary, deposits it on measurement table 20 is also associated with transport means 34. It is also contemplated that, within climatic chamber 30, a magazine 38 is provided, where several substrates or masks 2 are put in intermediate storage before they are subjected to measuring by means of coordinate measuring machine 1. Robot 40 arranged within the climatic chamber may thus be moved along a double arrow 42 to receive and deposit the masks correspondingly.

Figure 3:
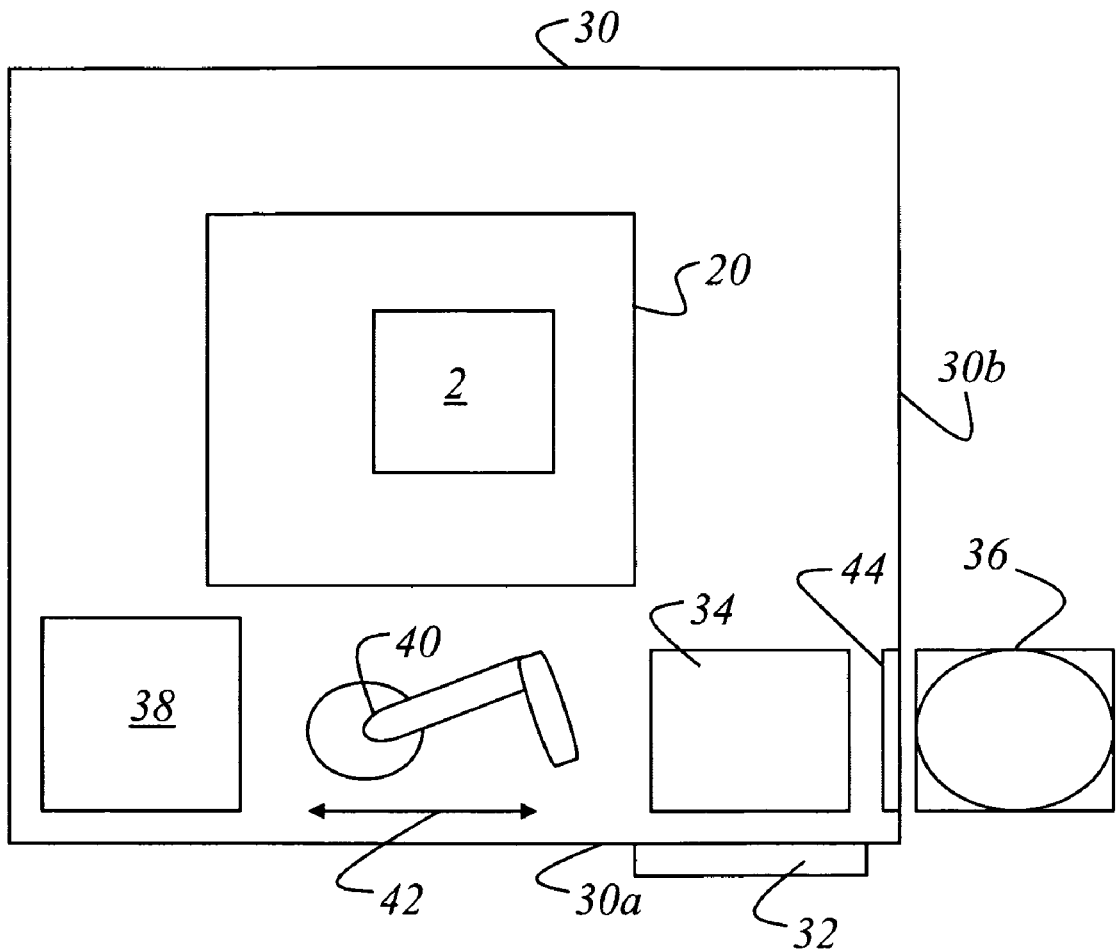
FIG. 3 shows a further embodiment of the device, wherein the means for orienting is mounted outside the climatic chamber and is thus an independent unit.

FIG. 3 schematically shows a further embodiment of the present invention. Means 36 for orienting mask 2 is arranged as an independent unit outside climatic chamber 30. In a further outer wall 30b of climatic chamber 30, an interface 44 is formed via which the substrates oriented by means 36 for orienting the substrates may be passed on to a further transport means 34 inside climatic chamber 30.

Figure 4:
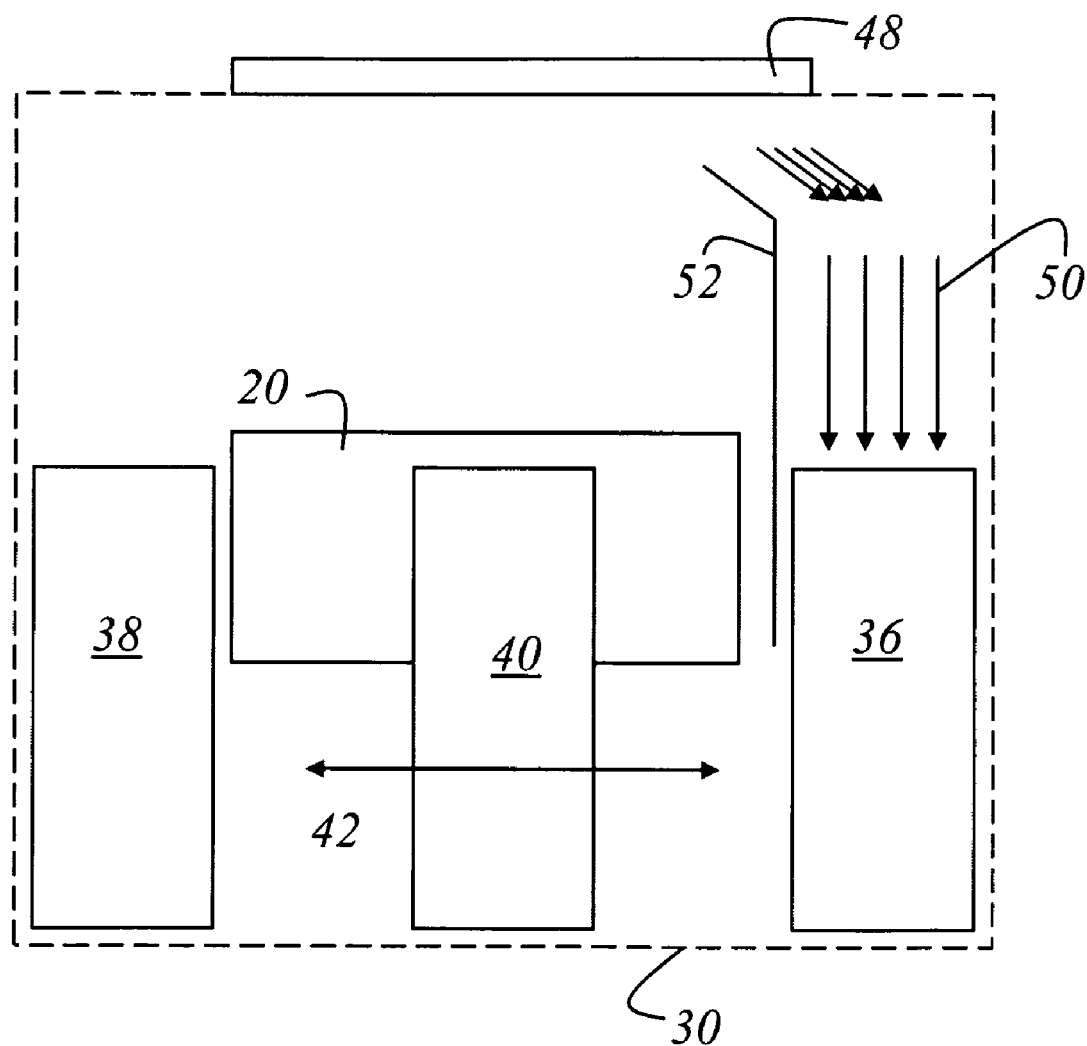
FIG. 4 shows a schematic representation, wherein the means for orienting is arranged within an air flow in the climatic chamber.

FIG. 4 shows the embodiment of the present invention in which means 36 for orienting substrates 2 is arranged in at least one air flow 50. Air flow 50 is formed within climatic chamber 30. In the illustration chosen, climatic chamber 30 is indicated by a broken line. A ventilator means 48 may be connected to climatic chamber 30, the ventilator means being suitable to generate a corresponding air flow within climatic chamber 30. For air flow 50 directed towards means 36 for orienting the substrates to form, air guiding plates 52 may be provided in climatic chamber 30. It is particularly advantageous if means 36 for orienting the substrates is formed within air flow 50, because in that way potential contaminations or particles on mask 2 may be removed by air flow 50.

Figure 5:
FIG. 5 shows a schematic representation of a mask or substrate provided with a marking based on which the orientation of the substrate may be determined; and, FIG. 6 shows a schematic representation of a capturing means for determining the orientation of the substrate or the mask.

FIG. 5 shows a schematic representation of mask 2 provided with several markings for the identification of mask 2. On the one hand, mask 2 may be provided with a bar code 54. It is also contemplated that the mask is provided with at least one number and letter coding 56. Based on markings 54, 56, the orientation of the mask may thus be determined and established by suitable image processing.

Figure 6:
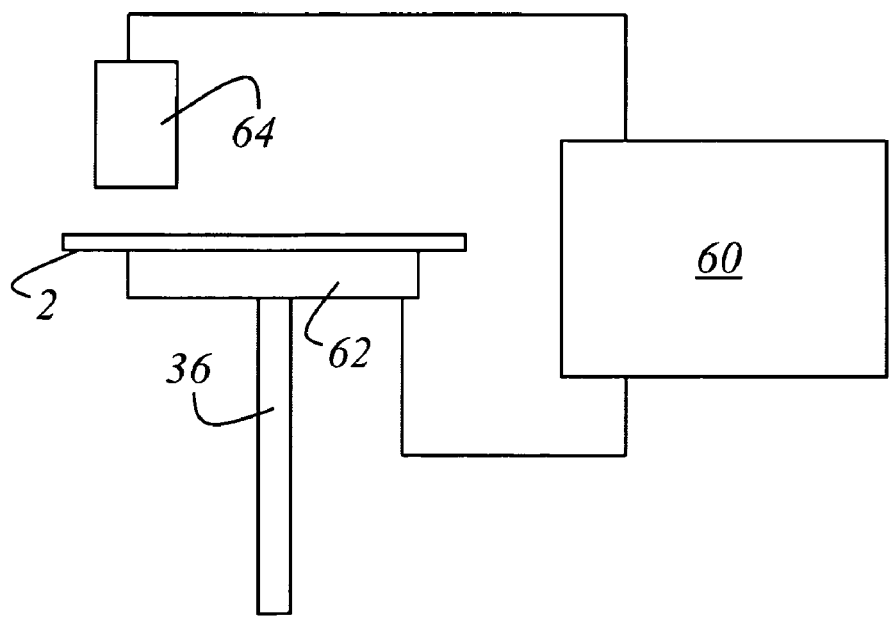

FIG. 6 shows a schematic representation of means 36 for orienting substrates or masks 2, which is connected to a computer 60. Means 36 for orienting mask 2 includes a rotary plate 62 with which the desired orientation may be set via computer 60. Opposite the mask, a camera 64 may be associated via which marking 54 or 56 of mask 2 is read and the orientation is determined therefrom by computer 60. It is also contemplated that the whole surface of the mask may be captured by camera 64, whereby the orientation of the mask may then be determined from the corresponding structures or markings. Essentially, orientations in steps of 90° are set for means 36 for orienting. The oriented masks 2 are then transferred to coordinate measuring machine 1 for measuring the structures. With the help of means 36 for orienting mask 2, it is possible to perform automatic setting of the orientations of mask 2 without withdrawing the mask from the coordinate measuring machine and re-transferring it thereto with a new orientation. The presence of means 36 for orienting mask 2 thus allows higher throughput for the measurement of masks 2. It is immediately clear that a significant amount of time may be saved by this method. For the automatic orientation of the mask, the mask is no longer withdrawn from the climatic chamber, so that it may also be returned to the measuring process after orienting. Repeated time-consuming temperature adaptation of the mask is thus avoided.

What is claimed is:

1. A device for measuring positions of structures on a substrate, comprising:
    a climatic chamber enclosing the device;
    a coordinate measuring machine and a measurement table movable in one plane;
    an illumination and imaging means arranged in the climatic chamber;
    at least one loading station for substrates is formed on an outer wall of the climatic chamber;
    at least one transport means for transporting the substrates within the climatic chamber;
    air guiding plates for directing at least one air flow in the climatic chamber; and,
    means for orienting the substrates with respect to a coordinate system of the coordinate measuring machine, wherein the transport means deposits the substrates on the means for orienting and wherein the means for orienting is located in the at least one air flow.

2. The device of claim 1, wherein the means for orienting is arranged in the climatic chamber.

3. The device of claim 1, wherein the means for orienting is associated with the device for measuring positions of structures outside the climatic chamber, as a separate means.

4. The device of claim 1, wherein the means for orienting of substrates carries out a defined rotation.

5. The device of claim 1, wherein a robot deposits the substrate on the means for orienting the substrate and is associated with the loading station.

6. The device of claim 1, wherein an illumination means and a camera acquiring an image of at least part of the substrate are associated with the means for orienting.

7. The device of claim 6, wherein the camera includes an evaluation unit for identification of the substrate.

8. The device of claim 6, wherein the camera captures a full image of the substrate and that the orientation of the substrate may be determined from the full image of the substrate.

9. The device of claim 8, wherein the means for orienting is connected to at least one computer setting an orientation of the mask input by the user.

10. The device of claim 9, wherein the computer is provided for the image evaluation of the images acquired by the camera.

11. The device of claim 1, wherein a magazine for depositing substrates is also associated with the coordinate measuring machine in the climatic chamber.

12. The device of claim 1, wherein the coordinate measuring machine in the climatic chamber includes a granite block on which the movable measurement table is arranged.

* * * * *